(12) United States Patent
Buschmann

(10) Patent No.: US 7,013,048 B2
(45) Date of Patent: Mar. 14, 2006

(54) METHOD AND APPARATUS FOR CODING A DIGITIZED ORIGINAL PICTURE AND METHOD AND APPARATUS FOR DECODING A DIGITIZED CODED PICTURE

(75) Inventor: Ralf Buschmann, Hoehenkirchen-Siegertsbr (DE)

(73) Assignee: Siemens Aktiengesellschaft, Munich (DE)

( * ) Notice: Subject to any disclaimer, the term of this patent is extended or adjusted under 35 U.S.C. 154(b) by 665 days.

(21) Appl. No.: 09/950,808

(22) Filed: Sep. 13, 2001

(65) Prior Publication Data

US 2002/0031274 A1 Mar. 14, 2002

(30) Foreign Application Priority Data

Sep. 13, 2000 (DE) ............... 100 45 247

(51) Int. Cl.
*G06K 9/36* (2006.01)
(52) U.S. Cl. .................................... 382/238
(58) Field of Classification Search ............... 382/162, 382/166, 232, 236, 238, 244–251
See application file for complete search history.

(56) References Cited

U.S. PATENT DOCUMENTS 5,703,649 A 12/1997 Kondo ..................... 348/408
6,266,447 B1 * 7/2001 Hoshi et al. ............... 382/236

FOREIGN PATENT DOCUMENTS

EP 0 260 721 3/1988
EP 0 618 731 A2 10/1994

OTHER PUBLICATIONS

J. De Lameillieure, R. Schäfer, MPEG-2-Bildcodierung für das digitale Fernsehen (MPEG-2 picture coding for digital television), Fernseh- und Kino-Technik, vol. 48, No. 3/1994, pp. 99-107, 1994.
Guichard et al., "Intra- and Inter Frame Transform Coding for Moving Pictures Transmission", IEEE, 1986, pp. 381-384.
Li et al., "Image Sequence Coding at Very Low Bitrates: A Review", 8395 Transactions on Image Processing, 3 (1994) Sep., No. 5, New York, US, pp. 509-609.

* cited by examiner

*Primary Examiner*—Joseph Mancuso
*Assistant Examiner*—Duy M. Dang
(74) *Attorney, Agent, or Firm*—Staas & Halsey LLP

(57) ABSTRACT

The discrete cosine transform of the prediction error is not necessarily calculated, rather the DCT of the original picture to be transmitted and the DCT of the temporally preceding reconstructed picture are calculated separately from one another. By comparing the amplitudes of the coefficients from the original signal with respect to the difference between the coefficients from the original signal and the reconstructed picture, a decision is made for each coefficient as to whether the coefficient of the original signal or the difference between the coefficients is transmitted.

20 Claims, 2 Drawing Sheets

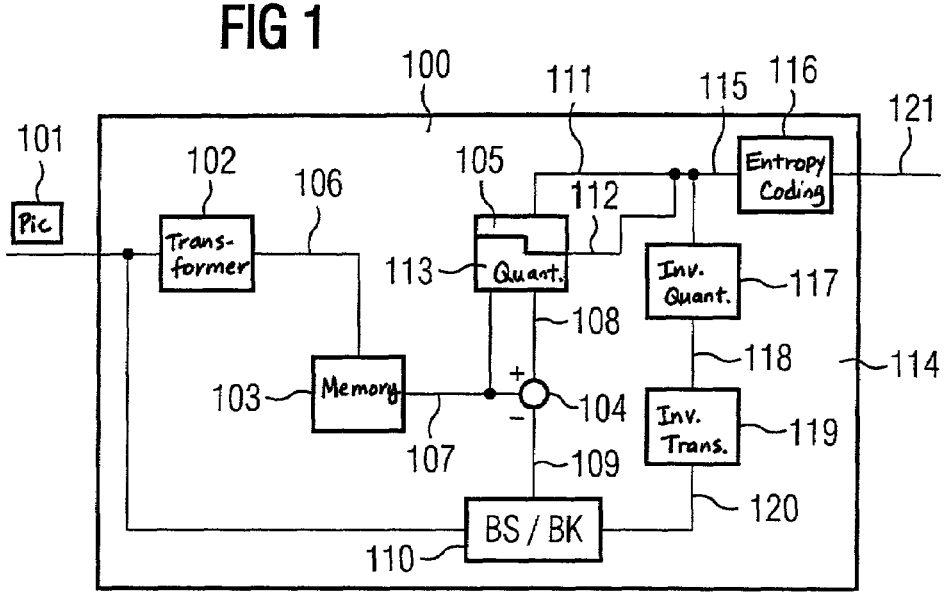
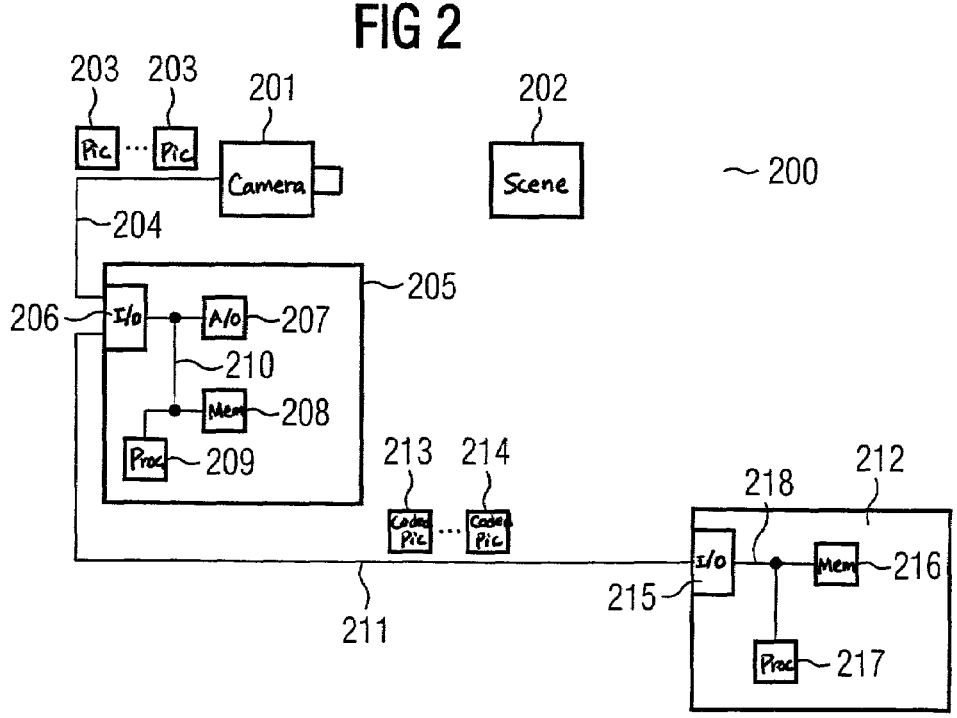

METHOD AND APPARATUS FOR CODING A DIGITIZED ORIGINAL PICTURE AND METHOD AND APPARATUS FOR DECODING A DIGITIZED CODED PICTURE

CROSS REFERENCE TO RELATED APPLICATIONS

This application is based on and hereby claims priority to Application No. 100 45 247.7 filed on 13 Sep. 2000 in Germany, the contents of which are hereby incorporated by reference.

BACKGROUND OF THE INVENTION

The invention relates to methods and apparatuses for coding and decoding a digitized original picture and, respectively, a digitized coded picture.

Such methods and such apparatuses are disclosed in J. De Lameillieure, R. Schäfer, MPEG-2-Bildcodierung für das digitale Fernsehen (MPEG-2 picture coding for digital television), Fernseh-und Kino-Technik, Volume 48, No. 3/1994, pp. 99–107, 1994.

In the known, standardized MPEG2 method, for the compression of digital moving picture sequences, that is to say for the coding of digitized pictures, coding information is assigned to pixels which are usually grouped into picture blocks or into picture objects.

Coding information shall hereinafter be understood to be, for example, brightness information (luminance information) and/or color information (chrominance information), which are assigned to the pixels of a digitized picture.

The coding information, which is originally present in the space domain, is, according to MPEG2, subjected to a Discrete Cosine Transform (DCT) and the DCT coefficients generated in this way are quantized and subjected to entropy coding.

A reconstruction picture is determined from the quantized DCT coefficients by an inverse quantization and an Inverse Discrete Cosine Transform (IDCT).

In this connection, a motion estimation between the original picture and a temporally preceding reconstruction picture is carried out.

For the coding, i.e. for the compression of the video data to be transmitted, a changeover is usually made between an inter coding mode and an intra coding mode.

In the context of the inter coding mode, the prediction error which has been determined as a result of the motion estimation as a difference value between the coding information of the picture block to be coded and the coding information of the picture block—determined by the motion estimation—of the temporally preceding picture is subjected to a DCT, quantized and fed to an entropy coding.

In the context of the intra coding mode, without taking account of coding information of temporally preceding pictures, the coding information of the original picture to be coded is subjected to a DCT and the resulting DCT coefficients are quantized and subjected to entropy coding.

Depending on the available data rate, in this case a coarse or a fine quantization of the DCT coefficients is chosen, i.e. set.

The coarser the quantization of the DCT coefficients is chosen to be, the more DCT coefficients are quantized to the value "zero" and the lower the data rate required for transmitting the coded original picture.

Often, a lower data rate is required for transmitting the prediction error than for transmitting the DCT coefficients—coded in accordance with the intra coding mode—of the original picture to be coded.

However, if the motion estimation is inaccurate, which, in particular, can often be observed at the boundaries of moving objects or at block boundaries between two respective picture blocks, the data rate for the prediction error may, however, also be higher than the data rate required for coding the original picture.

For this reason, a changeover between the inter coding mode and the intra coding mode is often provided in known coding methods, which changeover is intended to ensure that the signal transmitted is always the one which, overall, requires the lower data rate for its transmission.

The signal variance usually serves as a criterion for the decision as to whether a coding is to be carried out in accordance with the inter coding mode or in accordance with the intra coding mode. The said signal variance is calculated from the original picture directly, that is to say in the space domain. As an alternative, it could also be calculated by summation of the DCT coefficients determined, that is to say in the frequency domain. The signal with the lower sum of the DCT coefficients has the lower signal variance.

Furthermore, it is known that the low-frequency signal components of a video signal are usually well predicted by the motion-compensating prediction.

Accordingly, the corresponding DCT coefficients of low-frequency signal components of the respective original picture to be coded have a smaller amplitude than the DCT coefficients of the original signal. On account of estimation errors in the context of the motion estimation, however, the high-frequency signal components are often predicted only with inadequate quality, with the result that the DCT coefficients of the prediction error, which are hereinafter referred to as prediction coefficients, in this case have a higher amplitude than the DCT coefficients of the original picture.

SUMMARY OF THE INVENTION

Consequently, one aspect of the invention is based on the problem of coding and decoding a digitized picture which requires a lower transmission rate for its transmission by comparison with known coding methods.

In a method for coding a digitized original picture with pixels which are assigned coding information, spectral coefficients of the coding information of the original picture are determined. Furthermore, spectral coefficients of a reconstruction picture of a temporally preceding picture are determined. For at least a portion of the spectral coefficients determined, coefficient differences are determined from spectral coefficients of the original picture and the corresponding spectral coefficients of the reconstruction picture. A prediction coefficient is in each case formed by forming the respective difference between a spectral coefficient of the original picture and the corresponding spectral coefficient of the reconstruction picture. The prediction coefficients determined are compared with corresponding spectral coefficients of the original picture. At least in part, the respective smaller coefficient is selected and coded.

The method and apparatus described herein can be understood in the fact that selectively at the abstraction level of the individual spectral coefficients of the original picture to be coded and of a reconstructed picture of a temporally preceding picture, in each case that spectral coefficient is selected and transmitted whose spectral coefficient has a smaller value, that is to say which has a lower spectral power density.

Consequently, a DCT of the prediction error is not determined, rather a spectral transform is calculated separately both on the original picture to be coded and on the reconstructed picture of a temporally preceding picture and, on the basis of a comparison of the amplitude of the coefficients of the original signal with respect to the difference between the coefficients from the original signal and the reconstructed picture, for each coefficient a separate decision can be taken as to which is selected, coded and transmitted in the context of the coding of the picture. In this case, the decision that has been made is additionally signaled to the receiver.

A considerable reduction of the required data rate for the coding and transmission of a digitized picture in a moving picture sequence is obtained in this way.

By way of example, brightness information and/or color information may be assigned to the pixels as coding information.

One refinement provides for only the prediction coefficients with the value zero to be selected and coded.

If a prediction coefficient has a value not equal to zero, then, in accordance with one development of the invention, the corresponding spectral coefficient, that is to say spectral coefficient situated at the corresponding location within the picture, of the original picture is selected and coded.

In accordance with this refinement, a very simple coding that can thus be carried out in a manner requiring very little computation time is achieved, with improved coding efficiency.

A further refinement provides for a comparison in the manner described above to be carried out for all the coefficients of the original picture to be coded, and for the respectively suitable coefficient to be selected and coded, a coefficient being suitable if the selection leads to a lower volume of data for the coefficient and the selection information.

In order to form spectral coefficients, in accordance with a further refinement, it is possible to use a discrete cosine transform, as a result of which DCT coefficients are formed.

In order to enable decoding of the coded picture in a simple manner, for each selection made a selection decision indication, for example in the form of a bit which in each case indicates whether a prediction coefficient or a spectral coefficient of the original picture was selected and coded, is stored and transmitted to a decoder for the decoding thereof.

The selection decision indications may be effected, for example, in a selection decision vector of the dimension of the transmitted coefficients. The selection decision vector is coded in a suitable manner and transmitted.

In a method for decoding a digitized coded picture with spectral coefficients, prediction coefficients and selection decision indications which in each case indicate whether the respective coefficient is a spectral coefficient of the original picture or of the prediction error picture, spectral coefficients are formed for a temporally preceding reconstruction picture.

The coded picture is decoded taking account of the spectral coefficients, prediction coefficients and selection decision indications of the coded picture and the spectral coefficients of the temporally preceding reconstruction picture.

Corresponding apparatuses for carrying out the methods described above each have at least one processor which is set up in such a way that the method steps presented above are carried out.

The method and apparatus can be realized both by a specific electrical circuit, that is to say in hardware, and by a computer program, that is to say in software.

The method and apparatus can generally be used in any block-based and/or object-based method for coding and decoding a digitized picture, in particular a sequence of digitized pictures, that is to say a moving picture sequence, in which use is made of motion-compensating prediction, in particular motion estimation and motion compensation.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a block diagram illustrating an apparatus for coding a moving picture sequence in accordance with an exemplary embodiment of the invention;

FIG. 2 shows a block diagram illustrating a video communication system with a camera, a coder and a decoder in accordance with an exemplary embodiment of the invention;

DETAILED DESCRIPTION OF THE PREFERRED EMBODIMENT

Figure 3:
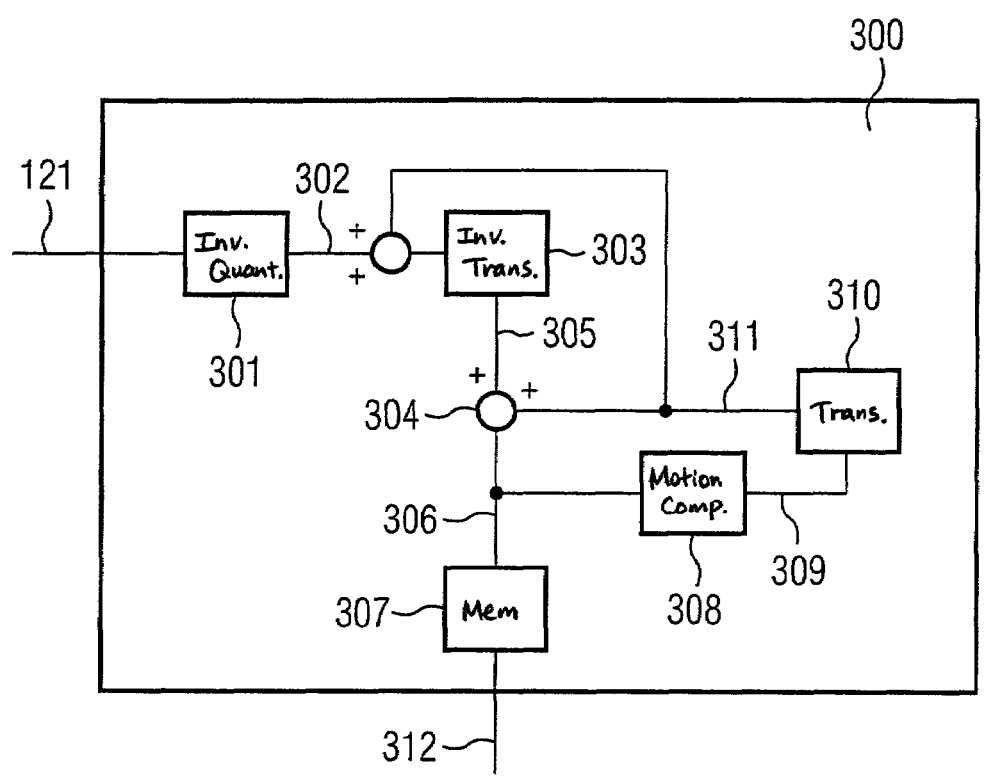
FIG. 3 shows a block diagram illustrating a decoding apparatus for decoding a coded video data stream in accordance with an exemplary embodiment of the invention.

Reference will now be made in detail to the preferred embodiments of the present invention, examples of which are illustrated in the accompanying drawings, wherein like reference numerals refer to like elements throughout.

FIG. 2 shows a video communication system 200 with a camera 201, which records a scene by a sequence 203 of temporally successive pictures.

The scene 202 has an arbitrary number of different objects.

The recorded sequence 203 of pictures is fed from the camera 201 via a first communications link 204, for example a cable or a radio link, to a coding apparatus 205.

After the coding apparatus 205 has received the pictures 203 via an input/output interface 206, the pictures are digitized by an analog-to-digital converter 207 of the coding apparatus 205 and the digitized pictures are stored in a memory 208.

Furthermore, the coding apparatus 205 has a processor 209, which is set up in such a way that the method steps described below can be carried out.

The logical components which are necessary in the context of the coding and decoding in accordance with the exemplary embodiment are illustrated in FIG. 1 and FIG. 3 and are explained in detail below.

In accordance with the exemplary embodiment, the functionalities of these individual components are stored as a program in the memory 208 of the coding apparatus or in a memory of the decoding apparatus described below and are executed by the processor 209 of the coding apparatus 205 or of the decoding apparatus, respectively, as explained in more detail below.

The individual components of the coding apparatus 205 are coupled to one another via a computer bus 210.

The coding apparatus 205 is coupled to a decoding apparatus 212 via the input/output interface 206 and via a second communications link 211, for example a radio link or a fixed network line, that is to say a cable.

Digitized, coded video pictures 213 are transmitted from the coding apparatus to the decoding apparatus 212 via the second communications link 211.

The coded pictures 213, 214 are received by the decoding apparatus 212 via an input/output interface 215 and stored in a memory 216.

Furthermore, the decoding apparatus 212 has a processor 217, which is set up in such a way that the corresponding method steps for decoding the coded pictures and thus for reconstructing digitized pictures can be carried out.

The components of the decoding apparatus 212 are coupled to one another via a computer bus 218.

FIG. 1 shows the logical structure of the coding apparatus 100, which, in accordance with this exemplary embodiment, is implemented in the form of a computer program carried out by the processor 207.

However, the components of the coding apparatus 100 can also be realized in each case as a specific electronic circuit on a separate computer card.

The pixels grouped into picture blocks are fed as a digitized picture 101 to the coding apparatus 100.

In a transformation unit 102, a Discrete Cosine Transform (DCT) is carried out on the picture blocks.

Furthermore, the pixels of the original picture 101 to be coded are fed to a unit for motion estimation and motion compensation 110.

The DCT coefficients 106 formed by the transformation unit 102 are stored in a memory 103.

Furthermore, the DCT coefficients of the original picture 101 are read from the memory 103 and fed as read-out DCT coefficients 107 to a subtraction unit 104.

In the subtraction unit 104, a read-out spectral coefficient 107 of the original picture 101 to be coded has subtracted from it in each case a corresponding spectral coefficient 109 of the temporally preceding picture, which spectral coefficient is formed by the unit for motion estimation and motion compensation 110 and corresponds to the corresponding picture position.

The difference, referred to below as difference coefficient 108, determined by forming the difference between the two mutually corresponding spectral coefficients of the original picture 101 to be coded and of the temporally preceding picture is fed to a quantization unit 113 and quantized there.

Furthermore, the spectral coefficients 107 of the original picture 101 to be coded are likewise fed to the quantization unit 113 and quantized there.

The quantized coefficients 108 are fed to a decision unit 105, for example a unit for forming the maximum 105 of the input quantities fed to the unit 105 for forming the maximum.

The respective larger value from the spectral coefficient 107 and the coefficient difference 108 is selected as selected coefficient 111 and coded.

As an alternative or in addition, in the decision unit 105, the data rate for signaling can also be taken into account for selection purposes.

Furthermore, the respective selected quantized coefficient 115 and also an indication 112 of whether the quantized coefficient is a spectral coefficient 107 of the original picture or the difference coefficient 108 (referred to below as coefficient indication 112) are fed to a unit for entropy coding 116, whereby a coded video data stream 121 is formed which is transmitted to the decoding apparatus 300, which is described below.

In a feedback loop 114, the selected and quantized coefficients 115 and also the coefficient indication 112 are fed to an inverse quantization unit 117, where they are converted into inverse-quantized coefficients 118.

The inverse-quantized coefficients 118 are transformed into inverse-coded coefficients 120 in an inverse transformation unit 119 by an Inverse Discrete Cosine Transform (IDCT).

The inverse-coded coefficients 120 are fed to the unit for motion estimation and motion compensation 110, which effects a customary motion estimation and motion compensation.

Consequently, in accordance with this procedure, for each DCT coefficient to be transmitted, a check is made to determine whether the DCT coefficient of the original picture 101 or of the reconstructed picture, that is to say of the prediction error picture, is transmitted, depending on which coefficient is smaller, i.e. has a lower value.

FIG. 3 shows the decoding apparatus 300, to which the coded video data stream 121 is fed.

In an inverse quantization unit 301, inverse-quantized spectral coefficients 302 are formed, which are fed to an inverse transformation unit 303, in which an inverse discrete cosine transform is carried out on the inverse-quantized coefficients 302 in order to form inverse-transformed coefficients 305.

The inverse-transformed coefficients 305 and the indication of whether the coefficients are difference coefficients or spectral coefficients of the original picture are fed to an addition unit 304.

Accordingly, either a reconstructed DCT coefficient 311—described below—of the temporally preceding picture is added or the reconstructed coefficient 305 is simply stored as spectral coefficient 306 in a memory 307.

In the unit for motion compensation 308, for the case where the coefficient 305 is a difference coefficient 108, motion compensation is carried out and the motion-compensated signal 309 is fed to a transformation unit 310 for carrying out a DCT transform.

The DCT coefficients 311 of the reconstructed picture that are formed are fed from the transformation unit 310 to the addition unit 304 and, for the case where a difference coefficient 108 is involved, the respective DCT coefficient 311 formed by the transformation unit 310 is added to the inverse-quantized coefficient 302.

From the memory 307, the reconstructed picture stored therein is read out as a reconstructed video signal 312 and displayed to the user of the decoding apparatus 300, for example via a screen.

The invention has been described in detail with particular reference to preferred embodiments thereof and examples, but it will be understood that variations and modifications can be effected within the spirit and scope of the invention.

What is claimed is:

1. A method for coding a digitized original picture with pixels which are assigned coding information, comprising:
    determining spectral coefficients of the original picture,
    determining spectral coefficients of a reconstruction picture of a temporally preceding picture,
    determining a coefficient difference for each spectral coefficients of the original picture and a corresponding spectral coefficients of the reconstruction picture, and forming prediction coefficients from the coefficient differences,
    comparing the prediction coefficients with corresponding spectral coefficients of the original picture, and
    for corresponding prediction coefficients and spectral coefficients of the original picture, selecting and coding the smaller coefficient.

2. The method as claimed in claim 1, wherein
only the prediction coefficients with a value of zero are selected and coded, and
otherwise the spectral coefficients of the original picture are selected and coded.

3. The method as claimed in claim 2, wherein
for each selection of a coefficient, a selection decision indication is stored and transmitted to a decoder.

4. The method as claimed in claim 2, wherein
at least one of brightness information and/or color information is assigned to the pixels as coding information.

5. The method as claimed in claim 4, wherein
the respective smaller coefficient is selected and coded for all the coefficients of the original picture to be coded.

6. The method as claimed in claim 5, wherein
DCT coefficients or integer transform coefficients are formed in determining the spectral coefficients.

7. The method as claimed in claim 6, wherein
for each selection of a coefficient, a selection decision indication is stored and transmitted to a decoder.

8. The method as claimed in claim 2, wherein
the respective smaller coefficient is selected and coded for all the coefficients of the original picture to be coded.

9. The method as claimed in claim 2, wherein DCT coefficients or integer transform coefficients are formed in determining the spectral coefficients.

10. The method as claimed in claim 1, wherein
at least one of brightness information and/or color information is assigned to the pixels as coding information.

11. The method as claimed in claim 10, wherein
DCT coefficients or integer transform coefficients are formed in determining the spectral coefficients.

12. The method as claimed in claim 3, wherein
for each selection of a coefficient, a selection decision indication is stored and transmitted to a decoder.

13. The method as claimed in claim 1, wherein
the respective smaller coefficient is selected and coded for all the coefficients of the
the respective smaller coefficient is selected and coded for all the coefficients of the original picture to be coded.

14. The method as claimed in claim 13, wherein
for each selection of a coefficient, a selection decision indication is stored and transmitted to a decoder.

15. The method as claimed in claim 1, wherein
DCT coefficients or integer transform coefficients are formed in determining the spectral coefficients.

16. The method as claimed in claim 1, wherein
for each selection of a coefficient, a selection decision indication is stored and transmitted to a decoder.

17. A method for decoding a digitized coded picture, comprising:
    forming individual spectral coefficients for a temporally preceding reconstruction picture, and
    decoding the digitized coded picture taking account of the spectral coefficients for a temporally preceding reconstruction picture, coded coefficients and selection decision indications each indicating whether a coded coefficient is a prediction coefficient or a spectral coefficient of the original picture.

18. An apparatus for coding a digitized original picture with pixels which are assigned coding information, comprising:
    a transformation unit to determine spectral coefficients of the original picture or of a reconstruction picture of a temporally preceding picture,
    a subtraction unit to form a coefficient difference for each spectral coefficient of the original picture and a corresponding spectral coefficients of the reconstruction picture, to thereby form prediction coefficients,
    a comparison unit to compare the prediction coefficients and corresponding spectral coefficients of the original picture, and
    a coefficient selection unit to select the respectively suitable coefficient, and
    a coding unit for coding the selected coefficients.

19. An apparatus according to claim 18, wherein when selecting the respectively suitable coefficient, the smaller coefficient is selected.

20. An apparatus for decoding a digitized coded picture, comprising:
    a forming unit to form individual spectral coefficients for a temporally preceding reconstruction picture, and
    a decoding unit to decode the digitized coded picture taking account of the spectral coefficients for a temporally preceding reconstruction picture, coded coefficients and selection decision indications each indicating whether a coded coefficient is a prediction coefficient or a spectral coefficient of the original picture.

* * * * *